(12) United States Patent
Agmon et al.

(10) Patent No.: US 8,488,974 B2
(45) Date of Patent: Jul. 16, 2013

(54) ENHANCED SMF PASSIVE OPTICAL NETWORKS USING POLARIZATION BEAMFORMING

(75) Inventors: Amos Agmon, Kiryat Motzkin (IL); Moshe Nazarathy, Haifa (IL)

(73) Assignee: Technion Research and Development Foundation Ltd., Haifa, IL (US)

( * ) Notice: Subject to any disclaimer, the term of this patent is extended or adjusted under 35 U.S.C. 154(b) by 516 days.

(21) Appl. No.: 12/668,474

(22) PCT Filed: Jul. 10, 2008

(86) PCT No.: PCT/IL2008/000954
§ 371 (c)(1),
(2), (4) Date: Jul. 22, 2010

(87) PCT Pub. No.: WO2009/007973
PCT Pub. Date: Jan. 15, 2009

(65) Prior Publication Data
US 2010/0284693 A1    Nov. 11, 2010

Related U.S. Application Data

(60) Provisional application No. 60/949,077, filed on Jul. 11, 2007.

(51) Int. Cl.
*H04B 10/00* (2006.01)

(52) U.S. Cl.
USPC .......... 398/152; 398/58; 398/63; 398/65; 398/66; 398/67; 398/184; 398/212

(58) Field of Classification Search
USPC .......... 398/58–73, 79, 152, 184, 185, 205
See application file for complete search history.

(56) References Cited

U.S. PATENT DOCUMENTS

| | | | | |
|---|---|---|---|---|
| 5,013,116 A | * | 5/1991 | Yamazaki et al. | 398/79 |
| 5,416,626 A | * | 5/1995 | Taylor | 398/185 |
| 5,912,755 A | * | 6/1999 | Bergano | 398/185 |
| 6,782,211 B1 | * | 8/2004 | Core | 398/205 |
| 2003/0206676 A1 | * | 11/2003 | Ovadia et al. | 385/11 |
| 2005/0074239 A1 | * | 4/2005 | Pohjola et al. | 398/70 |
| 2005/0265727 A1 | * | 12/2005 | Glingener | 398/152 |
| 2005/0265728 A1 | * | 12/2005 | Yao | 398/152 |

* cited by examiner

Primary Examiner — Li Liu
(74) Attorney, Agent, or Firm — Oren Reches

(57) ABSTRACT

The new invention relates to a novel high-performance Passive Optical Network (PON) upgrade architecture, based on adapting Multiple Input, Multiple Output (MIMO) beamforming techniques to polarization multiplexing.

20 Claims, 11 Drawing Sheets

_US 8,488,974 B2_

ENHANCED SMF PASSIVE OPTICAL NETWORKS USING POLARIZATION BEAMFORMING

FIELD OF THE INVENTION

The invention relates to a novel high-performance Passive Optical Network (PON) upgrade architecture, based on adapting Multiple Input, Multiple Output (MIMO) beamforming techniques to polarization multiplexing.

BACKGROUND OF THE INVENTION

Passive optical networks are widely used, for example in Fiber To The Premises (FTTP) service or a Fiber To The Curb (FTTC) services. Since the PON uses passive devices, power supply is not required for managing the optical devices except the end points equipment. Furthermore, the PON can provide high-speed data services over a relatively large service area.

Examples of the PON include an Ethernet-passive optical network (E-PON) using a time division multiplexing (TDM) communication scheme. The E-PON is an Ethernet based PON used for point-to-multipoint connections, and the Institute of Electrical and Electronics Engineers (IEEE) 802.3ah provides complete standards for the E-PON. In the E-PON, a passive splitter of a Remote Node (RN) splits an optical core of a service provider so as to distribute the optical core to subscribers, and a passive optical coupler of the RN couples optical cores of subscribers together so as to transmit data from the optical cores of the subscribers to the optical core of the service provider. Therefore, downstream data from the service provider are naturally broadcasted.

In another type of the PON called wavelength division multiplexing-passive optical network (WDM-PON), the wavelength of an optical source is used. In the WDM-PON, pluralities of wavelengths are multiplexed.

As communication volume increases, there is a need for an optical network that can efficiently accommodate increasing subscribers and/or communication volume without wasting network resources. Specifically, it is advantageous to be able to upgrade existing PON system to provide higher performance without replacing the entire fibers spans.

U.S. Pat. No. 6,344,919; to Dutta, et al. entitled "Methods and systems for producing linear polarization states of light at the end of a length of optical fiber"; filed May 5, 2000; discloses methods and devices for quickly producing all possible linear polarization states of light at the output of a length of optical fiber. Linearly polarized light is input and is transmitted through a fiber. Due to the birefringence of the fiber, light at the output of the fiber is elliptically polarized irrespective of the input polarization. The elliptically polarized states of light at the output are generated as an arbitrary circle on an output Poincare sphere. This arbitrary circle is then manipulated to produce a final circle substantially coinciding with the equator of the Poincare sphere. This final circle represents all possible linear polarization states at the output of the fiber. The disclosed device eliminates the need for determining transformation matrices and performing point-by-point calculations in order to obtain input polarization settings for polarization-based, passive optical network ("PON") testing.

REFERENCES

[1]. F. Effenberger, D. Clearly, O. Haran, G. Kramer, Li Ruo Ding; M. Oron, T. Pfeiffer, "An introduction to PON technologies," Communications Magazine, IEEE Volume 45, Issue 3, S17-S25 (2007).

[2]. A. Agmon and M. Nazarathy, "Broadcast MIMO over multimode optical interconnects by modal beamforming," Optics Express, submitted for publication (2007); Enclosed in the appendix herein.

[3]. H. R. Stuart, "Dispersive Multiplexing in Multimode Optical Fiber," Science 289, 281-283 (2000).

[4]. Y. Taesang and A. Goldsmith, "On the optimality of multiantenna broadcast scheduling using zero-forcing beam forming," IEEE J. Selected Areas Comm. 24, 528-541 (2006).

[5]. A. Yariv, "Operator algebra for propagation problems involving phase conjugation and nonreciprocal elements", Applied Optics 26, 21 (1987)

[6]. D. S. Bethune and W. P. Risk, "Autocompensating quantum cryptography", New Journal of Physics 4, 42.1-42.15 (2002)

[7]. A. D. Kersey, M. J. Marrone, M. A. Davis, "Polarization-insensitive fiber optic Michelson interferometer", Electronics Letters 27, 6 (1991).

[8] S. Benedetto and P. T. Poggiolini, "Multilevel Polarization Shift Keying: Optimum Receiver Structure and Performance Evaluation", IEEE Transactions on communications Vol. 42, February 1994

SUMMARY OF THE INVENTION

It is an object of the present invention to provide a high-performance Passive Optical Network (PON) upgrade architecture.

It is another object of the present invention to provide a PON based on adapting Multiple Input, Multiple Output (MIMO) beamforming techniques to polarization multiplexing.

It is thus provided in accordance with a preferred embodiment of the present invention an optical communication system comprising:

a server having a server transceiver for transmitting optical downlink signal to plurality of end user transceivers capable of detecting optical signals, wherein said server transceiver is capable of transmitting polarization controlled optical downlink signal;

a trunk single mode, non polarizing optical fiber receiving downlink signal from said server transceiver and transferring said signal to server port of a polarizing beam splitter; said polarizing beam splitter directs X polarization and Y polarization components of said downlink signal to X port and Y port of said polarizing beam splitter respectively;

an X non-polarizing single mode optical fiber connected to X port of said polarizing beam splitter and transmitting said X component of said downlink signal to at leas one user; and a Y non-polarizing single mode optical fiber connected to Y port of said polarizing beam splitter and transmitting said Y component of said downlink signal to at leas one user, wherein said server transceiver capable of transmitting downlink polarization controlled signal such that said downlink signal is substantially transmitted to one of X port or Y port depending to which of said users said downlink signal is intended.

Furthermore, in accordance with another preferred embodiment of the present invention, said transmitter of said server transceiver comprises:

a solid state laser emitting optical signal;

a splitting polarizing beam splitter splitting said optical signal to a first and second polarizations branches;

an intensity modulator modulating intercity of signal in said first polarization branch;

an intensity modulator modulating intercity of signal in said second polarization branch;
a phase modulator modulating relative phase of signals in said first and second polarization branches; and
a combiner polarizing beam splitter combining optical signals from said first and second polarizations branches,
   wherein modulation parameters of said modulators are selected such that downlink signal is substantially transmitted to one of X port or Y port depending to which of said users said downlink signal is intended.

Furthermore, in accordance with another preferred embodiment of the present invention, the system further comprises at least one non-polarizing splitter/combiner connected to at least one of said X non-polarizing single mode optical fiber or said X non-polarizing single mode optical fiber and directing downlink signal to plurality of end users.

Furthermore, in accordance with another preferred embodiment of the present invention, at least one of said end user transceivers further comprises an optical transmitter capable of transmitting optical signal to be detected by said server transceiver.

Furthermore, in accordance with another preferred embodiment of the present invention, said server controlling of said downlink polarization controlled signal is in response to information received from at least on of said end users.

Furthermore, in accordance with another preferred embodiment of the present invention, at least one said end user optical transmitter capable of transmitting uplink polarization controlled optical signal such that said uplink polarization controlled optical substantially transmitted through said polarizing beam splitter.

Furthermore, in accordance with another preferred embodiment of the present invention, at least one said end user optical transmitter capable of transmitting uplink polarization controlled optical signal comprises:
a first laser emoting signal polarized in first polarization;
a second laser emoting signal polarized in second, polarization, wherein said first and second polarization are substantially orthogonal; and
a combining polarizing beam splitter directing light from said first and second lasers to one of said X non-polarizing single mode optical fiber or Y non-polarizing single mode optical fiber,
wherein selection of first, second or both lasers to be operated to transmit uplink signal is chosen depending on transmission of said uplink signal through said polarizing beam splitter.

Furthermore, in accordance with another preferred embodiment of the present invention, at least one said end user optical transmitter capable of transmitting uplink polarization controlled optical signal comprises:
a solid state laser emitting optical signal;
a splitting polarizing beam splitter splitting said optical signal to a first and second polarizations branches;
an intensity modulator modulating intercity of signal in said first polarization branch;
an intensity modulator modulating intercity of signal in said second polarization branch;
a phase modulator modulating relative phase of signals in said first and second polarization branches; and
a combiner polarizing beam splitter combining optical signals from said first and second polarizations branches,
wherein modulation parameters of said modulators are selected on transmission of said uplink signal through said polarizing beam splitter.

Furthermore, in accordance with another preferred embodiment of the present invention, server transceiver is capable to detect and analyze polarization sensitive uplink optical signal.

Furthermore, in accordance with another preferred embodiment of the present invention, said modulation parameters of said downlink modulators are calculated non-iteratively in response to feedback data provided by at least one end user based on training signal transmitted by said server transceiver.

Furthermore, in accordance with another preferred embodiment of the present invention, said polarization state of at least one of said uplink user transceiver is calculated non-iteratively in response to feedback data provided by said server based on training signal transmitted by said end user transceiver.

Furthermore, in accordance with another preferred embodiment of the present invention, said modulation parameters of said downlink modulators are calculated iteratively in response to feedback data provided by at least one end user based on training signal transmitted by said server transceiver.

Furthermore, in accordance with another preferred embodiment of the present invention, said polarization state of at least one of said uplink user transceiver is calculated iteratively in response to feedback data provided by said server based on training signal transmitted by said end user transceiver.

Furthermore, in accordance with another preferred embodiment of the present invention, the system further comprises:
a server wavelength multiplexer having:
   a common port connected to said trunk single mode, non polarizing optical fiber receiving downlink signal from said server;
   a first wavelength port connected to and in proximity to said server port of said polarizing beam splitter; and
   a second wavelength port connected to and in proximity to a common port of an uplink non polarizing beam splitter/combiner;
an X branch wavelength multiplexer having:
   a common port connected to said X single mode fiber;
   a first wavelength port connected to and in proximity to said X port of said polarizing beam splitter; and
   a second wavelength port connected to and in proximity to first port of said non polarizing beam splitter/combiner; and
an Y branch wavelength multiplexer having:
   a common port connected to said Y single mode fiber;
   a first wavelength port connected to and in proximity to said Y port of said polarizing beam splitter; and
   a second wavelength port connected to and in proximity to second port of said non polarizing beam splitter/combiner;
and wherein server transceiver transmit optical signals at first wavelength while said end user transceivers transmit signals at second wavelength.

Furthermore, in accordance with another preferred embodiment of the present invention, the system further comprises:
a server transceiver comprising:
   a server downlink transmitter emitting optical signals at first wavelength connected to first wavelength port of a wavelength multiplexer having:
   a common port connected to said trunk single mode fiber;
   a first wavelength port connected to server downlink transmitter; and a second wavelength port connected to a common port of a beam splitter/combiner;

a carrier transmitter connected to the first port of said beam splitter/combiner and transmitting optical signal at second wavelength to said trunk fiber; and a uplink receiver connected to the second port of said beam splitter/combiner and receiving optical signal at second wavelength from said trunk fiber;

an X 45 degrees Faraday rotator inserted between X port of polarizing beam splitter and X fiber in proximity to X port of said polarizing beam splitter;

a Y 45 degrees Faraday rotator inserted between Y port of polarizing beam splitter and Y fiber in proximity to Y port of said polarizing beam splitter;

and wherein at least one user transceiver further comprising a controlled optical amplifier capable of controllably amplifying optical signals at second wavelength in response to uplink data, said amplifier is connected to one of X or Y fibers at its first port and to a 45 degrees Faraday mirror at its second port.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

For clarity, non-essential elements were omitted from some of the drawings.

In the drawings:

FIG. 1 depicts a polarization PON upgrade wherein the first splitter is replaced by a PBS according to a preferred embodiment of current invention.

FIG. 2 depicts a polarization and Wavelength Splitter-Combiner (PWSC) according to the current invention.

FIG. 3 depicts the first system embodiment for a PoITDM PON using a Polarization and Wavelength Splitter-Combiner (PWSC) at the first splitting level according to the current invention.

FIG. 4 depicts a Maximum Polarization Selection (MPS) transmitter at the ONU wherein binary information signal is modulating the Maximum Polarization Selected (MPS) laser, limiting the PBS loss to 3 dB, at the worst case according to the current invention.

FIG. 5 depicts the second system embodiment of a PoITDM PON using a simple PBS at the first splitting level and an ONU consisting of an MPS transmitter according to the current invention.

FIG. 6 depicts the third system embodiment of a PoITDM PON using a simple PBS at the first splitting level and an ONU consisting of an SOP modulation transmitter according to the current invention.

FIG. 7 depicts a retroreflective system comprising a cascade of a 45° Faraday Rotator (FR), birefringent fiber, and 45° Faraday Mirror (FM) according to the current invention.

FIG. 8 depicts a reflective ONU transmitter according to the current invention.

FIG. 9 depicts the forth system embodiment of a PoITDM PON using a simple PBS at the first splitting level, a reflective transmitter at the ONU and the 4th OLT embodiment according to the current invention.

FIG. 10 depicts the OLT of the 4th system embodiment according to the current invention FIG. 11 depicts the State of polarization (SOP) modulation transmitter according to the current invention.

DESCRIPTION OF A PREFERRED EMBODIMENTS

Figure 1:
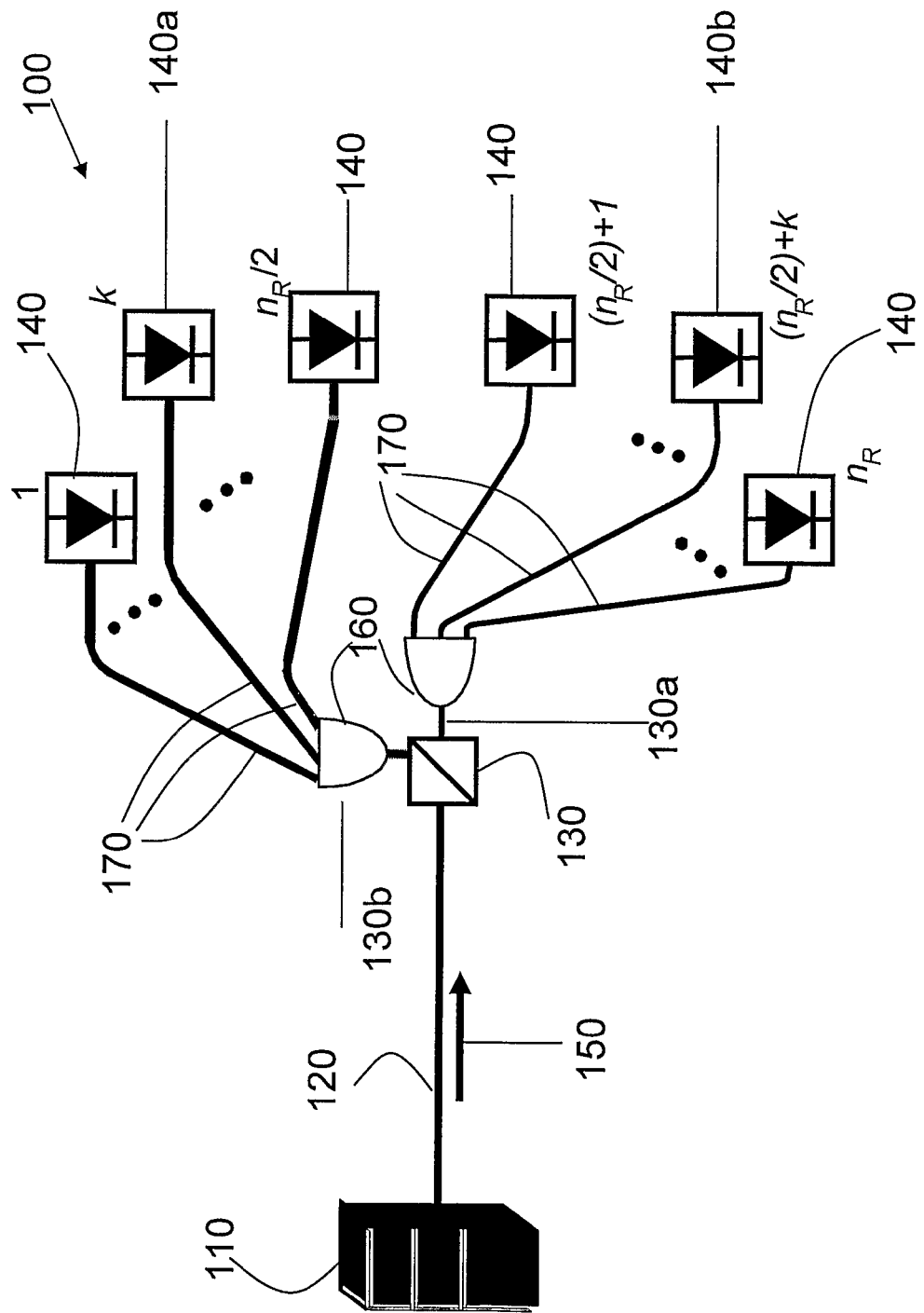

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

The terms "comprises", "comprising", "includes", "including", and "having" together with their conjugates mean "including but not limited to".

The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Detailed Description of the Mechanism

A novel high-performance Passive Optical Network (PON) upgrade architecture is introduced, based on adapting Multiple Input, Multiple Output (MIMO) beamforming techniques to polarization multiplexing.

We propose a Polarization-Multiplexing (PolMux) based upgrade for Time-Division Multiplexing (TDM) based Passive Optical Networks (PON) [1], yielding a combined Polarization-Time Division Multiplexing (PoITDM) scheme, enabling significant performance improvement. In the Downstream direction the proposed scheme doubles the data rate from the Optical Line Terminal (OLT) to each Optical Network Unit (ONU) or alternatively gains a 3 dB advantage in loss budget. In the upstream direction of the preferred embodiment, data rate is doubled and in addition, a 3 dB power gain is achieved. Furthermore, the novel proposed PoITDM upgrade architecture provides the advantage of variable optical power splitting, in the downstream direction, to all the PON nodes, yielding significant performance improvement beyond the factor-of-two advantages just mentioned.

In its preferred embodiment, our approach requires modifications in the OLT, and ONUs requiring to just slightly perturb the overall optical distribution structure (which remains passive) by replacing the first Optical Power Splitter (OPS) by a Polarization Beam Splitter (PBS).

Four alternative system-embodiments are suggested according to the current invention, differing by their upstream transmission approaches, corresponding to four different ONU and OLT embodiments and different distribution structures. In all four system embodiments, the ONUs are endowed with the ability to measure the received photocurrents during certain training periods. The overall increase in system complexity appears justifiable given the substantial performance enhancements.

The novel architecture is applied to PON systems based on Single-Mode Fiber (SMF)—the rationale being that each SMF path in the PON may be considered a 2×2 MIMO system with respect to the two orthogonal polarizations supported by single-mode fiber. It should be mentioned that MIMO Zero-Forcing Beamforming theory (ZFBF), previously ported by the inventors to optical MMF transmission [2]. It is nevertheless possible to interpret the new architecture solely in terms of Jones matrix theory, without resorting to the advanced optical MIMO concepts.

1. First System and Down Stream Operation

In discussion of the various figures described herein below, like numbers refer to like parts. The drawings are generally not to scale. For clarity, non-essential elements were omitted from some of the drawing.

Reference is now made to FIG. 1 illustrating PON architecture 100 in accordance with a preferred embodiment of the present invention, were the first splitter is replaced by a PBS 130. FIG. 1 represent a network with an optical transmitter OLT 110, connecting to a splitter PBS 130 whose output lines of the x and y polarization are connected each to a passive splitter the output of the each passive splitter is connected by birefringent fiber 170 to $n_R$ users 140, 140a, and 140b, were for expediency reasons of the concept, users are first demonstrated on a simplified network with only a down stream 150 link, ignoring implications of the concept on the upstream path, which are detailed in latter on. An OLT transmitter 110 incorporates State-Of-Polarization (SOP) modulator (illustrated in FIG. 11) capable of arbitrary SOP generation. Fiber trunk 120 from the OLT is terminated at its first passive splitting point in a Polarization Beam Splitter (PBS) 130, with x- and y-outputs 130a and 130b respectively, rather than conventional OPS. Unlike a conventional TDM PON, wherein in each time slot the transmission is intended to a unique user, the signaling in each time slot is concurrently addressed to a unique pair of users, respectively connected to the x- and y-outputs of the PBS. In each time slot the two accessed users are fed by optical powers in a particular ratio, aimed at making their Signal to Noise Ratio (SNR)s equal (i.e. the user with higher loss is fed proportionately more power over its polarization path).

As each of the two orthogonal polarizations is independently modulated, the data rate is now doubled, yet without incurring a power penalty as each polarization traverses the PBS losslessly (unlike a conventional polarization-independent OPS which produces a 3 dB power loss). On the other hand, the total transmitted power being divided between two polarizations, rendering the net budget seen by each user identical to that of the corresponding conventional PON. This establishes the data rate doubling for the same topology, transmission power and Bit Error Rate (BER) performance.

Similar considerations indicate that the doubling of data rate (for the same BER and loss budget) as described above, may be traded off for a 3 dB advantage in loss budget under two alternative configurations: In one scenario, the bitrate per user and BER are kept the same while the loss budget is increased by 3 dB. In another scenario, under the same bitrate per user and BER, the number of users is doubled, which requires just 3 dB extra investment in loss budget rather than 6 dB as in a conventional PON system—yielding a net 3 dB advantage.

It remains to specify the operation of the polarization controller in the transmitter, effecting the polarization transformation compensating for the time-varying birefringence of the SMF fiber trunk, and setting the variable power splitting ratio requisite for equal SNRs at each pair of users accessed during any particular time slot. To this end we adopt a so-called beamforming zero-forcing approach [2], adapted to the current PolMux setting in a way amenable to description solely in terms of Jones matrix theory.

Let U denote the Jones unitary matrix describing the fiber trunk 120 (from the OLT 110 to the PBS 130), stable over the coherency time of ~1 msec over which the birefringence essentially stays constant. In the k-th time slot of the TDM frame, a particular pair of users, the k-th pair, 140a, and 140b, accesses the two respective ports (polarization paths) of PBS. The applicable channel matrix is $H^{(k)} = \sqrt{\eta^{(k)}} U$, where $\eta^{(k)} \equiv \text{diag}\{\eta_x^{(k)}, \eta_y^{(k)}\}$, accounts for the power-domain (propagation and splitting) losses $\eta_x^{(k)} \eta_y^{(k)}$ of the x and y polarization paths from the transmitter all the way to the two users of the k-th pair. The OLT 110 synthesizes a pair of Jones vectors $A_x, A_y$, referred to here as PseudoModes (PM), designed to transform into pure x-(y-) polarized SOPs at the PBS (with x,y the principal axes of the PBS). Referring to FIG. 1, the $A_x$ ($A_y$) signal traverses the PBS unattenuated and is diverted to the upper (lower) half of the PON. Further requiring unity powers at the two users 140a, 140b, the PMs should satisfy:

$$H^{(k)} A_x^{(k)} = [e^{-j\theta_x}, 0]^T, H^{(k)} A_y^{(k)} = [0, e^{-j\theta_y}]^T \qquad (1)$$

where $\theta_x, \theta_y$ are arbitrary phase factors. The PolMux transmitter 110 launches in each symbol interval a SOP consisting of a superposition of the two PMs, each modulated by an independent data bit, $s_i, i=1,2$:

$$E^s = E_0 (A_x^{(k)} s_1 + A_y^{(k)} s_2)$$

where $E_0$ is scalar gain factor determined by the available transmit power. The photocurrents, generated by the quadratic detectors are:

$I_p = E_0^2 |s_p|^2 + N_p$, $p \in \{x,y\}$ with $N_p$ additive Gaussian noise. In effect the polarization-channel has been decoupled, with the input bit $s_1(s_2)$ propagating via the x(y) ports of the PBS 130, i.e. being independently routed to each of the two users 140a, 140b, with the PBS acting as a lossless switch.

As the output unit vectors in (1) both have the same (unity) energy, the SNRs attained at both users are equal. The On-Off Keying BER at each of the two users is $\text{BER} = Q[\sqrt{\langle \eta_p^{(k)} \rangle_H \gamma_U}]$
where $\gamma_U \equiv P_T/(2\sigma_1)$ is the transmit SNR-per-user $P_T$ the total transmit power being divided between the two users over the two polarizations and $\langle \eta_p^{(k)} \rangle_H \equiv 2[(\eta_x^{(k)})^{-1} + (\eta_y^{(k)})^{-1}]^{-1}$
is the harmonic mean of the loss factors $\eta_x^{(k)}, \eta_y^{(k)}$.

Assuming that the Channel Matrix (CM) $H^{(k)}$ is known to the transmitter, the pseudo-modes are simply (up to phase factors) the two columns of the inverse of the CM.

Having half the users (those accessed via the x-polarization) with their corresponding set of $\eta_x^{(k)}$, k=1, ..., $n_R/2$ "loss budgets" and half the users (accessed via the y-polarization) with their corresponding set of $\eta_y^{(k)}$, k=1, ..., $n_R/2$ loss budgets, we have the freedom of matching the pairs of x and y users, in each of the timeslots. Determining the optimal combination of active-detectors pairs according to some optimality criteria, such as minimum average BER, is the known User Selection problem in the context of broadcast MIMO. An intuitive feel may be obtained by considering a simple strategy consisting of pairing up "strong" (low loss) users with "weak" (high loss) users, such that some of the excess transmit power, which would have brought the strong users to higher than necessary SNR, is utilized to enhance the SNR of the weak users.

It remains to specify the CSI Estimation Procedure (CSIEP) whereby the transmitter obtains Channel State Information (CSI), i.e. estimates the CM. We assume the availability of a feedback channel (disclosed later herein), typically via the upstream channel over the same PON, with the receivers feeding back to the transmitter their raw responses to a training sequence periodically launched by the transmitter in each coherency interval of ~1 msec, incurring a negligible overhead of the order of 1%, relative to the doubled high bitrate per ONU. The CSIEP entails two stages, (i) the estimation of the loss coefficients $\eta_x^{(k)}$, $\eta_y^{(k)}$ and (ii) the estimation of the elements of unitary Jones matrix U. Stage (i) consists of launching a training sequence consisting, for an example, of the canonical unit vector symbols, $s=[1,0]^T$ and $s=[0,1]^T$ and repetitions thereof.

The two (x,k)-receivers measure the analog samples of their photocurrents conveying these quantized samples upstream to the transmitter. In turn the transmitter adds up the two samples, yielding the desired estimate:

$$\hat{\eta}_p^{(k)} = (I_{p[1,0]}^{d(k)} + I_{p[0,1]}^{d(k)})/E_0^2, p \in \{x,y\},$$

Due to the thermal noise, the responses to the training sequence are noisy, with the noise being independent from sample to sample. The training symbols are then repeatedly transmitted L times in order to attain an averaging gain improving the SNR of the estimates by a factor L. As for stage (ii) of the CSIEP, the squared absolute values of elements of U are readily estimated, e.g. for the elements of the first row we have $$|\hat{U}_{11}^{(k)}|^2 = I_{x[1,0]}/(E_0^2 \eta_x^{(k)}), |\hat{U}_{12}^{(k)}|^2 = I_{x[0,1]}/(E_0^2 \eta_x^{(k)})$$

In addition to the averaging over all users, in each of the two polarizations in each time slot, we may further average the partial estimates over multiple time slots. We next determine the angles of the complex elements of U. Actually, just the differences of the angles of the two elements in each row are observable. The formulas are too long to reproduce here but the procedure is based on launching the test vectors $[1,1]^T$ and $[1,j]^T$ (45°-linear and circular SOPs) and estimating the $s_2, s_3$ Stokes parameters. It may be shown that:

$$\hat{\delta}_1 \equiv \angle U_{11} - \angle U_{12} = \arctan\left[\frac{I_{x[Lj]}^{(k)}/(\hat{\eta}_x^{(k)} E_0^2) - 1}{I_{x[L1]}^{(k)}/(\hat{\eta}_x^{(k)} E_0^2) - 1}\right] \quad (3)$$

$$\hat{\delta}_2 \equiv \angle U_{21} - \angle U_{22} = \arctan\left[\frac{I_{y[Lj]}^{(k)}/(\hat{\eta}_y^{(k)} E_0^2) - 1}{I_{y[L1]}^{(k)}/(\hat{\eta}_y^{(k)} E_0^2) - 1}\right] \quad (4)$$

And the estimated k-th users pair CM is then:

$$\hat{H}^{(k)} = \begin{pmatrix} \sqrt{\hat{\eta}_x^{(k)}} & 0 \\ 0 & \sqrt{\hat{\eta}_y^{(k)}} \end{pmatrix} \begin{pmatrix} e^{j\theta_1} & 0 \\ 0 & e^{j\theta_2} \end{pmatrix} \begin{pmatrix} |\hat{U}_{11}| & |\hat{U}_{12}|e^{-j\hat{\delta}_1} \\ |\hat{U}_{21}| & |\hat{U}_{22}|e^{-j\hat{\delta}_2} \end{pmatrix} \quad (5)$$

In addition to the deterministic training scheme described above, that requires a dedicated training sequence to be transmitted, a training algorithm may be used for constant channel drift estimation using the detected informative signal. It may be found efficient to begin with a dedicated training sequence and constantly keep track of the channel during normal data detection.

2. First System Embodiment

Conventional ONU Transmitter with Polarization and Wavelength Splitter-Combine Previously, the PoITDM scheme was applied to the downstream transmission, ignoring the implications of the requisite modifications in the optical distribution structure to accommodate upstream transmission. Actually, transmitting the upstream signal through the PBS introduced above for the purpose of downstream improvement would result in upstream power instability due to the fact that the SOPs transmitted upstream by the ONUs are generally misaligned with respect to the PBS axes, yielding random power attenuations at the PBS, distributed according to:

$\rho_{P,PBS} \equiv P_{in,PBS}/P_{out,PBS} = [\cos(\phi)]^2$;  $\phi \sim \text{Uniform}[0, 2\pi]$, where $\phi$ is the relative angle between the SOP direction arriving at the PBS input and the relevant PBS axis (x or y, depending on the specific ONU) direction. In an extreme case where the upstream signal arrives at the PBS rotated by 90° with respect to corresponding PBS polarization axis, this signal will be completely blocked. We refer to the effect just described as "upstream polarization fading".

A Polarization and Wavelength Splitter-Combiner (PWSC) module is used as an alternative method for preventing the undesired upstream polarization fading effect, subject to the following specifications: (i) no further complexity be added to the ONU transmitter, keeping it identical to a conventional one. (ii) The upstream data-rate improvement with respect to a conventional ONU is renounced, i.e. the upstream performance is identical to that of a conventional TDM PON.

Figure 2:
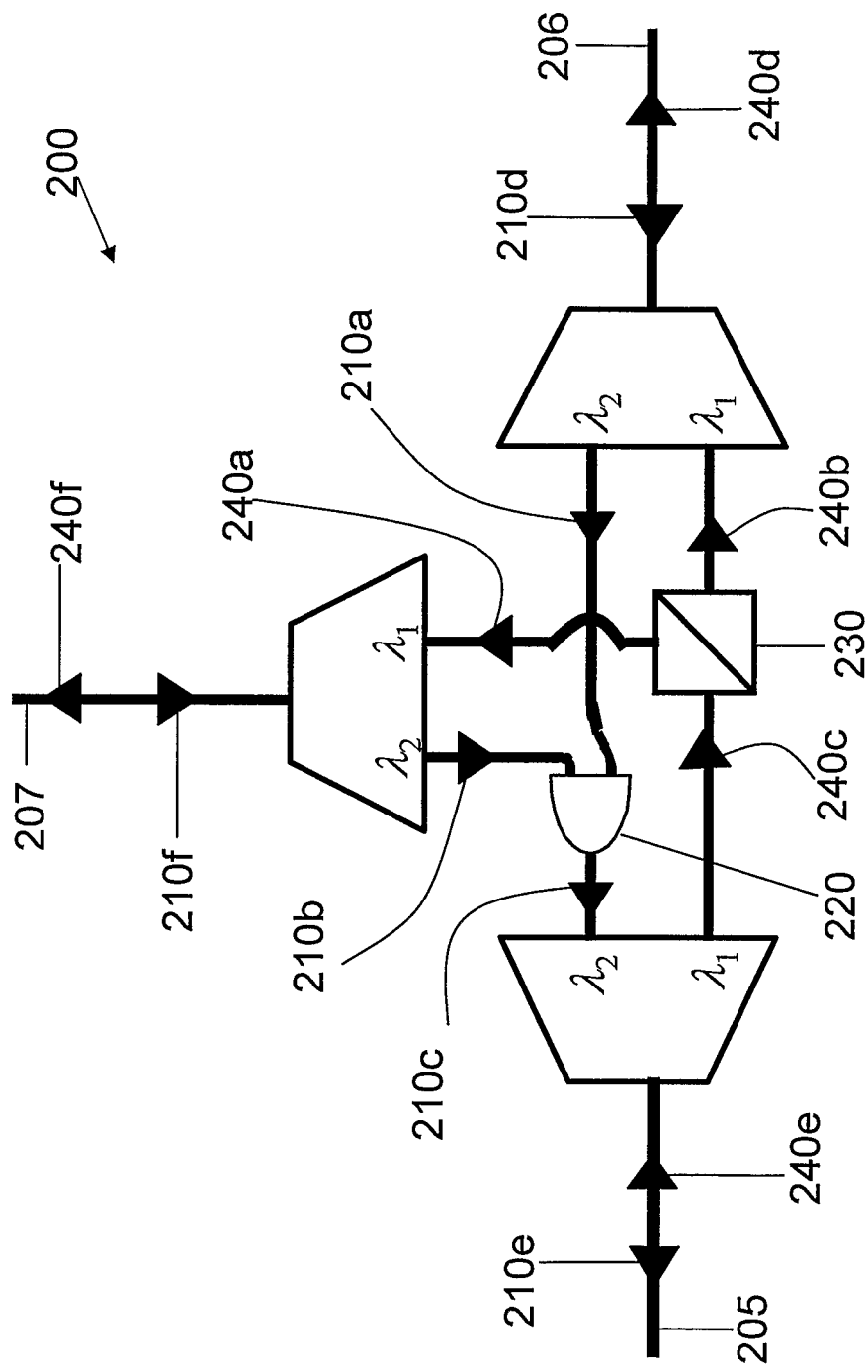

Reference is now made to FIG. 2 illustrating the PWSC module 200 in accordance with a preferred embodiment of the present invention. Line 205 is connected to OLT; lines 206 and 207 are connected to splitters 160. The upstream is represented by 210(a, b, c, d, e, f) and downstream by 240(a, b, c, d, e, f) and 220 is a 3 dB passive combiner. The propagation wavelength demultiplexed to bypass the PBS, routing and combining the upstream signals through 3 dB passive combiner 220 rather than through the PBS 230.

Figure 3:
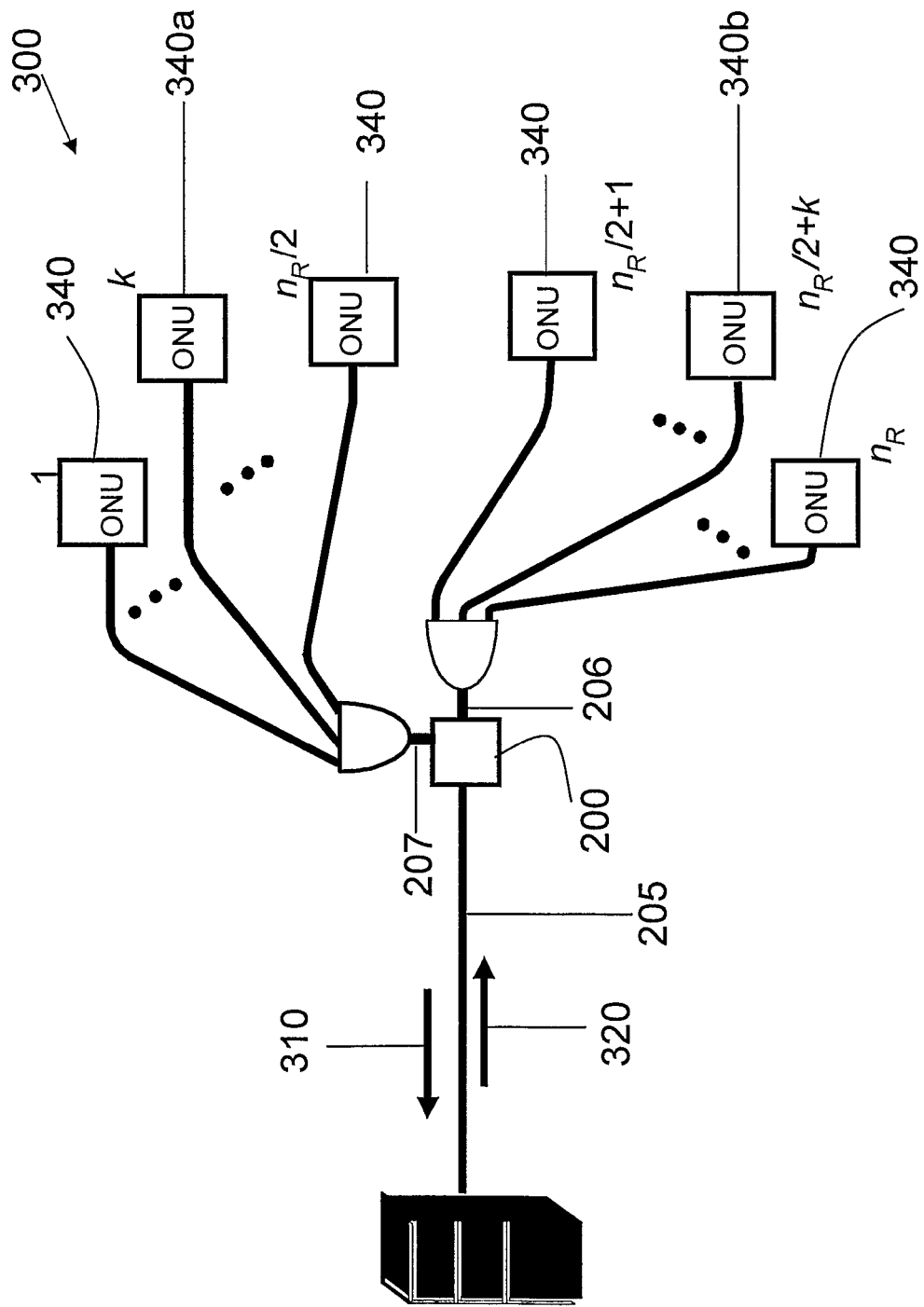

Reference is now made to FIG. 3 illustrates system 300 with PWSC module 200 replaces the simple PBS component at the first splitting level, in accordance with a preferred embodiment of the present invention; The downstream signal 320 passes through PBS 230 to optical network users (ONUs)

340, 340a, and 340b while the upstream transmission 310 is routed through 3 dB passive combiner 220. It should be noted that the two extra WDM components that the signal traverses in its path, introduce additional loss. For example, this loss for a modern WDM is typically <0.3 dB. Therefore, about 0.6 dB of excess loss is encountered by the PWSC, with regard to a standard passive splitter.

3. Second System Embodiment

Maximum-Polarization-Selection Transmitter at the ONU

Figure 4:
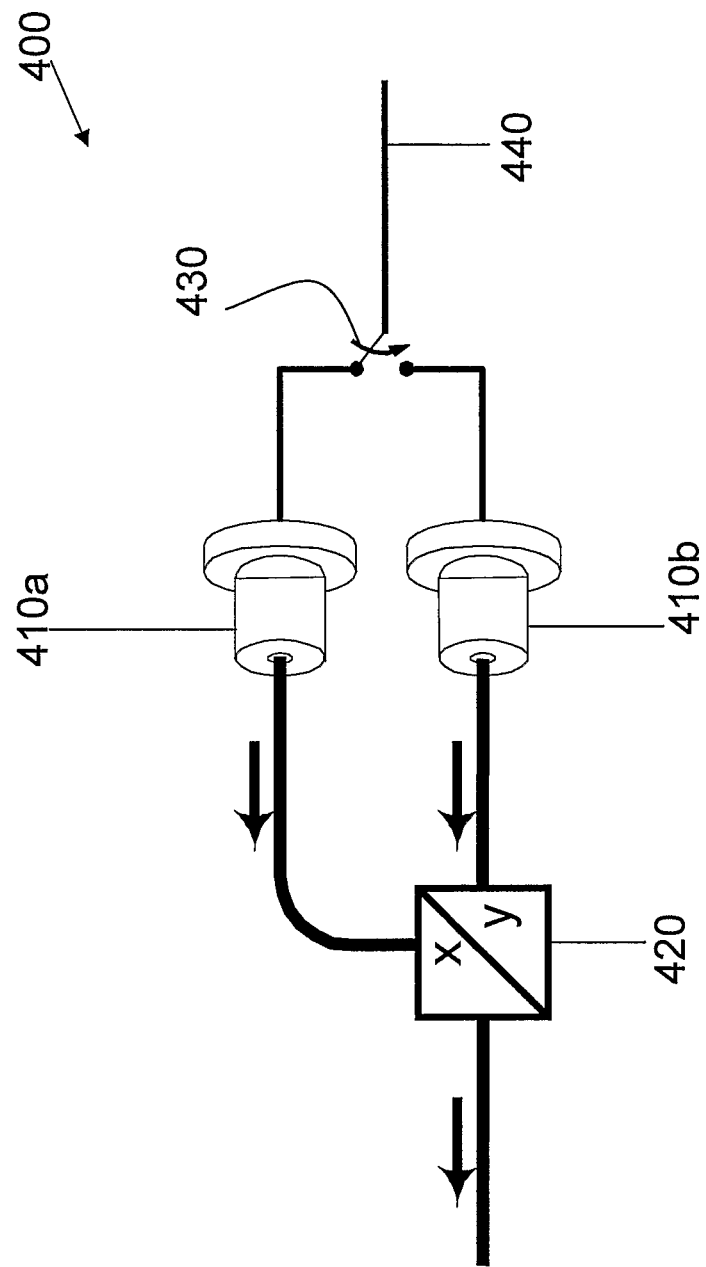

Reference is now made to FIG. 4 illustrating Maximum-Polarization Selection (MPS) transmitter 400 at the ONU, in accordance with a preferred embodiment of the present invention; MPS 400, described in this section may be feasible subject to the following specifications: (i) optical distribution structure should be kept simple, avoiding additional components beyond the PBS in FIG. 1. (ii) ONU transmitter may be reasonably modified (iii) upstream data-rate improvement with respect to a conventional ONU is required. This system embodiment allows for doubling the upstream data rate with respect to a conventional system, if a SOP receiver is used at the OLT, instead of a conventional polarization insensitive detector. It also provides variable upstream BER performance at least as good as that of a conventional system (at its worst the performance matches that of a conventional system).

MPS 400 suggests a modified ONU transmitter consisting of two polarized lasers 410a and 410b, capable of transmitting in two orthogonal SOPs. A probing signal 430 is transmitted once by each of the two lasers in turn in each coherency interval (over which the fiber birefringence is effectively constant), enabling the OLT receiver to detect which of the two orthogonal polarizations launched by the ONU is received stronger, encountering lower attenuation via the PBS 420. This SOP is referred to as the maximum polarization. The OLT feeds this information back to the ONU, through a feedback channel, typically over the downstream transmission in the same network. The ONU then selects to modulate its upstream data 440 onto the maximum polarization laser, throughout the coherency interval. The attenuation of the maximum polarization introduced by the PBS 420 is a random variable (fixed within each coherency interval) distributed according to: $\eta_{P,PBS}=\max\{[\sin(\phi)]^2; [\cos(\phi)]^2\}$; $\phi \sim \text{Uniform}[0,2\pi]$, yielding a random power loss $\frac{1}{2} \leq \eta_{P,PBS} \leq 1$ in the range [0,3] dB. In comparison, the passive combiner, used in a conventional TDM PON as well as in the first system embodiment described in section 2, is characterized by a fixed 3 dB combine loss, i.e. some power gain is expected on the average when using the $2^{nd}$ system embodiment, however, the worst case, $\eta_{P,PBS}=\frac{1}{2}$, attained $\phi=45°$, matches that of a conventional PBS. Binary information signal on line 440 is modulating the Maximum Polarization Selected (MPS) laser, limiting the PBS loss to 3 dB, at the worst case. Recalling the downstream concept: the OLT transmits a signal which is a linear combination of two PMs, each one modulated by its own data tributary. This downstream signal is then split at the PBS into its two orthogonal components, which are losslessly routed by the PBS to their designated side of the network. The upstream transmission concept is similar to the downstream concept, only in the opposite direction: in each time-slot, a pair of ONUs, one from the x-polarization wing of the network and the other one from the y-polarization wing is transmitting simultaneously. As these two ONUs are connected to different sides of the PBS, their signals after passing PBS are orthogonally superposed, yielding a two dimensional signal, composed of two orthogonal polarizations modulated by two independent bit-streams corresponding with the two active ONUs. This signal may be decoded by a conventional Stokes Parameters Detector (SPD), after a simple training sequence required for learning the trunk fiber polarization transformation is transmitted (alternatively: from channel reciprocity, downstream CSI may be used instead of a training sequence). The two ONUs in each pair transmits simultaneously thus double data-rate with respect to the $1^{st}$ system embodiment, is achieved. A SPD may be formed in a way similar to that shown in [8], adapted to the incoherent detection case using interferometers.

Figure 5:
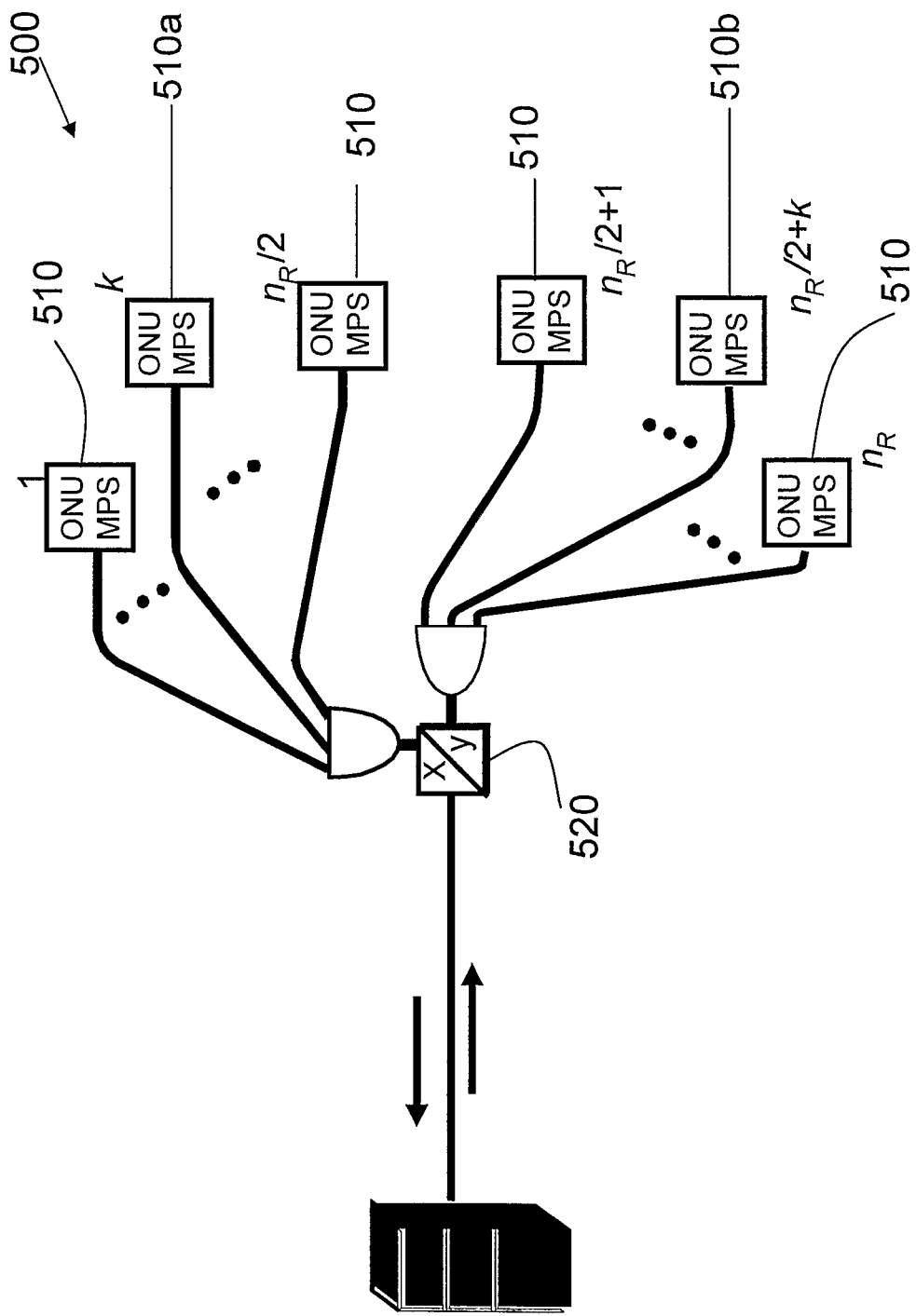

Reference is now made to FIG. 5 illustrating system 500 with PoITDM PON using a simple PBS 520 at the first splitting level and an ONUs 510, 510a and 510b consisting each of an MPS transmitter 400 in accordance to 2nd ONU embodiment.

4. Third System Embodiment

State of Polarization Transmitter at the ONU

The $3^{rd}$ system embodiment may be feasible subject to the following specifications: (i) optical distribution structure should be kept simple, avoiding additional components beyond the PBS in FIG. 1. (ii) ONU transmitter may be reasonably modified (iii) upstream data-rate improvement with respect to a conventional ONU is required.

A solution satisfying these specifications, using a SOP modulator 1100 (FIG. 11) at the ONU suggests a modified ONU transmitter equivalent to the OLT transmitter, capable of transmitting arbitrary SOP. The upstream transmission concept for this system embodiment is similar to that of the second system embodiment described above in Section 3, where a pair of ONUs are transmitting simultaneously and detected by a Stokes Parameters Detector (SPD) after a simple training sequence.

It now required ensuring that the signal transmitted by each ONU is coordinated with the PBS direction. One possible way is to apply the MPS transmission scheme described in the previous section on the two ONUs transmitting simultaneously. A superior method, in terms of upstream power gain, is to learn the polarization transformation of the lead fibers connecting the ONUs with the PBS (by means of a training sequence), and feed-back this information from the OLT the ONUs so each ONU can transmit a signal having a SOP matched to its PBS 110 port, thus passing the PBS losslessly.

Applying this scheme entails a double of the multiplexing gain: having two ONUs transmitting simultaneously, instead of one in a conventional TDN PON. In addition, a 3 dB power gain is introduced at the upstream direction equivalently to the downstream direction: The signal transmitted by the ONUs is passing the PBS losslessly, while in a conventional TDM PON, a 3 dB loss is introduced by the passive combiner.

Figure 6:
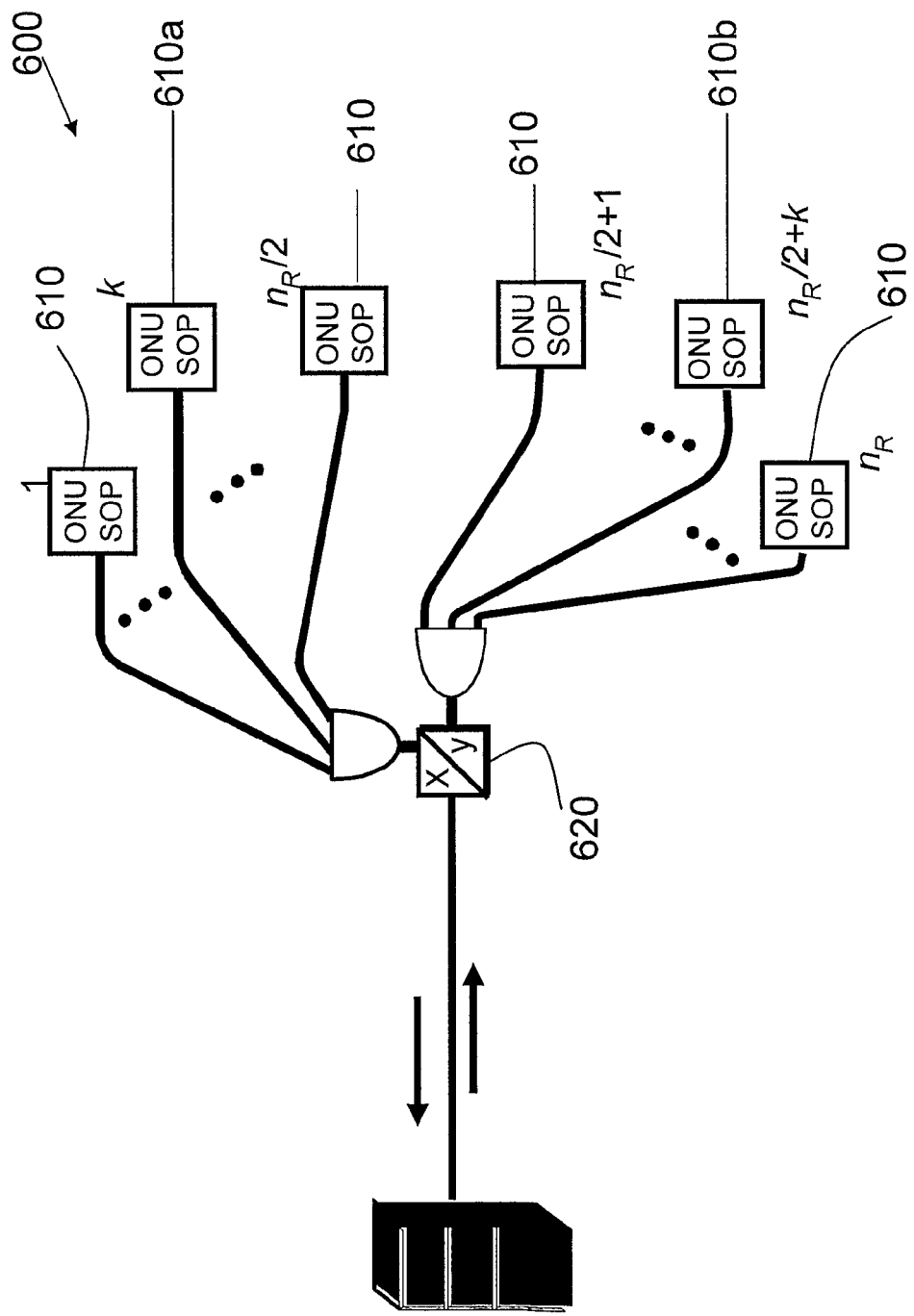

Reference is now made to FIG. 6 illustrating system 600 with PoITDM PON using a simple PBS 620 at the first splitting level and ONUs 610, 610a and 610b consisting each of an SOP modulation transmitter 1100 in accordance to 3rd ONU embodiment. The two ONUs in each pair transmits simultaneously thus double data-rate with respect to the $1^{st}$ system embodiment. The upstream signal benefits from a 3 dB gain at the expense of a more complex SOP modulation transmitter at the ONU.

5. Fourth System Embodiment

Preferred

In this embodiment we introduce an auto-compensating scheme for the upstream based on several new ingredients: (i) the usage of reflective Semiconductor Optical Amplifier (SOA) in the upstream as already disclosed in. (ii) Non-reciprocal polarization-transforming elements: Faraday rotators and Faraday mirrors.

This embodiment functions in the downstream as described in Section 2, featuring the same downstream performance as those of the first three system embodiments, but in the upstream it derives a "factor-of-four advantage" for the manifested in several alternative ways, e.g., a factor of two advantage in throughput (doubling the upstream data rate from each ONU for the same number of ONUs, transmitted power, BER at the OLT), as well as a 3 dB advantage in optical loss budget (not counting the advantage due to the variable power splitting).

The recently introduced PON structure replaces the laser in each ONU with a SOA device which acts as an amplifier for the upstream carrier optical power (around the wavelength of $\lambda_2$, for example, 1.3 µm) centrally supplied by the OLT over the network to all the ONUs, which is reflected back into the upstream direction. The SOA also acts as an On-Off-Keying (OOK) modulator, by switching its gain on and off. In our invention we enhance the reflective SOA PON by incorporating the PBS as the first splitting stage as disclosed for the downstream in Section 2, which ensures the downstream performance improvement, and further mitigating the upstream polarization fading problem by means of a new architecture comprising non-reciprocal Faraday-rotation based elements as described next. We first digress into with a brief description of the two types of components to be used in our embodiment:

(i) A Faraday Rotator (FR) is an optical device that rotates the polarization of light due to the Faraday effect, which in turn is based on a magneto-optic effect.

(ii) A Faraday Mirror (FM) is composed of a 45° FR followed by a conventional reflective element (mirror). Looking into the FM, we see light returning rotated by 90°.

The reason for the 90° SOP rotation introduced by a FM is that unlike a reciprocal rotator (e.g. one realized based on the optical activity effect) a Faraday rotator traversed backward rotates the light in the same sense to (viewed in the reference frame of the incident light) irrespective of the direction of propagation (actually viewed in the reference frame of the reflected light, it rotates the light into the inverse sense than that for forward propagation in the incident frame). This means that the two rotations for the forward and backward propagations actually compound rather than offsetting each other. For a 45° FM, the total rotation is then 45°+45°=90°, i.e. the 45° FM behaves like a 90° rotator. This means that any linearly polarized SOP is rotated by 90° to be orthogonal to the incident SOP. As shown in [6, 7], a 45° FM preceded by a birefringent fiber, appears as an extended reflective element, which when looked into at the birefringent fiber port still appears as a 45° FM (i.e. executes a rotation by 90° of its input SOP) irrespective of the birefringence of the fiber. In effect terminating the birefringent fiber by the 45° FM, has the beneficial effect of compensating for the birefringence of the fiber. This auto-compensating arrangement was used in [6] for quantum-key-distribution and in [7] for interferometric sensing.

Here we augment this FM element with a 45° Faraday Rotator (FR) at the other end of the birefringent fiber 170 in FIG. 1.

Figure 7:
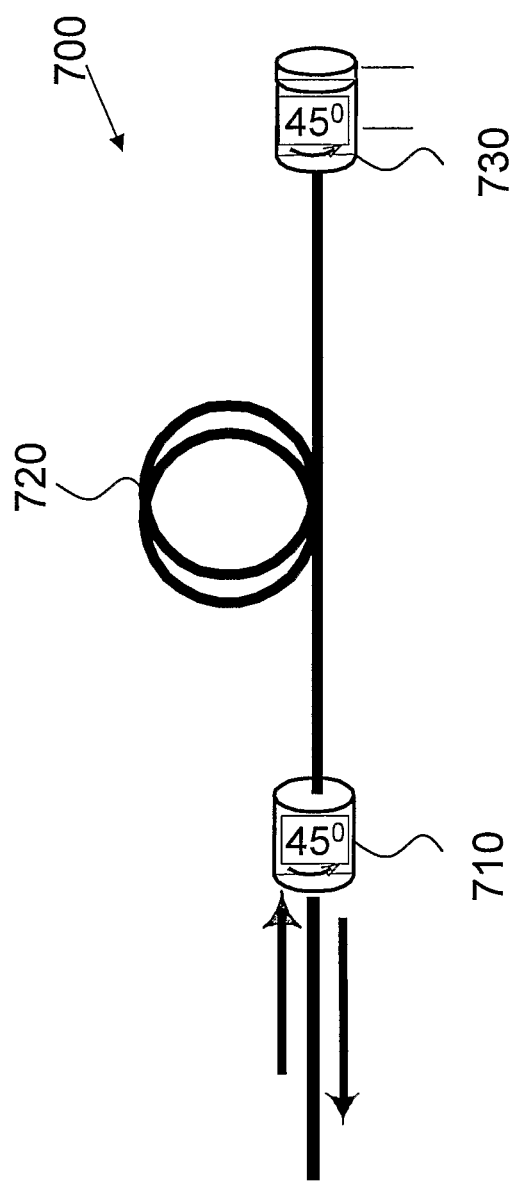

Reference is now made to FIG. 7 illustrating cascade 700 from the FR side (at the other side we have the mirror and we cannot look into) in accordance to a preferred embodiment. The arrangement described here, namely a 45° FR 710 followed by a birefringent fiber 720 and terminated in a 45° FM 730, is new and may have additional uses beyond the PON structures disclosed in this invention. As described below (illustrated in FIG. 8 and in FIG. 9), this arrangement is incorporated between the PBS and the ONU. This arrangement provides total reflective compensation of the birefringence of the fiber, reflecting back precisely the same SOP.

The net effect is retro-reflection of the very same polarization input that was launched in, irrespective of the birefringence of the fiber. This property may be justified by the bidirectional Jones calculus of [5] but it is also possible to justify it intuitively as follows:

The 45° FM preceded by the fiber appears as a net 45° FM, irrespective of the birefringence of the fiber. Hence it suffices to prove that an overall reflective element obtained by the cascade of a 45° FR and a 45° FM amounts to a perfect mirror (identity Jones matrix, discarding the 180° phase-shift upon reflection off a conventional mirror, which multiplies the SOP vector by −1). Indeed, as the 45° FM supplies a 90° rotation, upon traversing the 45° FR, then the 45° FM, then the 45° FR backward, we accrue a rotation angle of 45°+90°+45°=180°. This net rotation amounts to inverting both the x and y components i.e. multiplying the SOP vector by −1, which may be discarded (absorbed in the overall axial phaseshift) i.e. the net effect is an identity operator (scaled by a complex constant indicative of the overall attenuation and phaseshift).

It should be mentioned that the description above works as long as the birefringence of the fiber is reciprocal and affected by polarization-independent loss, conditions which are met in practice to a good approximation.

We refer to this subsystem as a polarization-retroreflective one, applying it to the PON structure to solve the problem of the polarization-fading in the upstream direction due to the insertion of the PBS (which was inserted in order to improve downstream performance).

Figure 8:
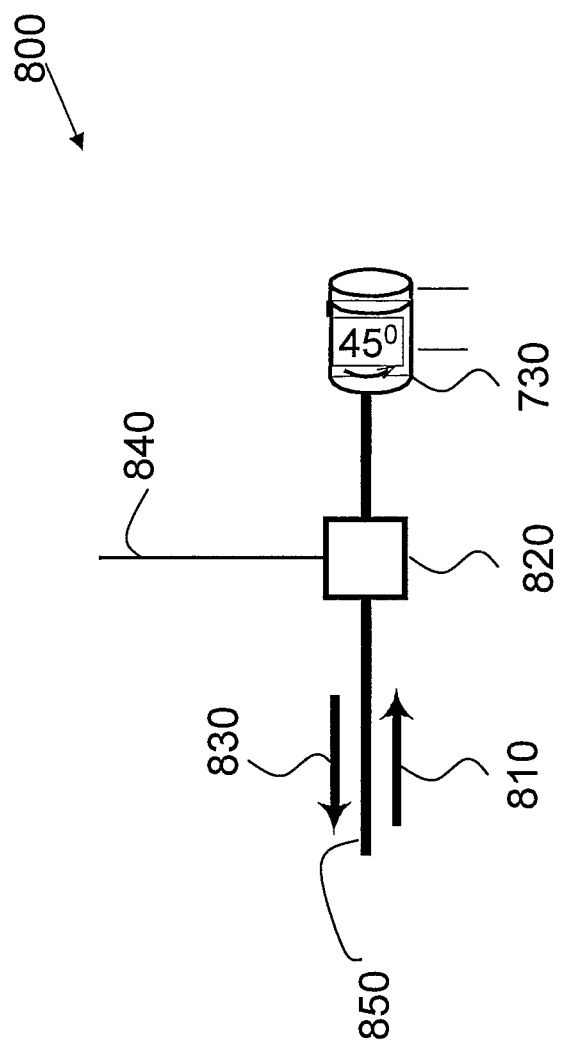
Figure 9:
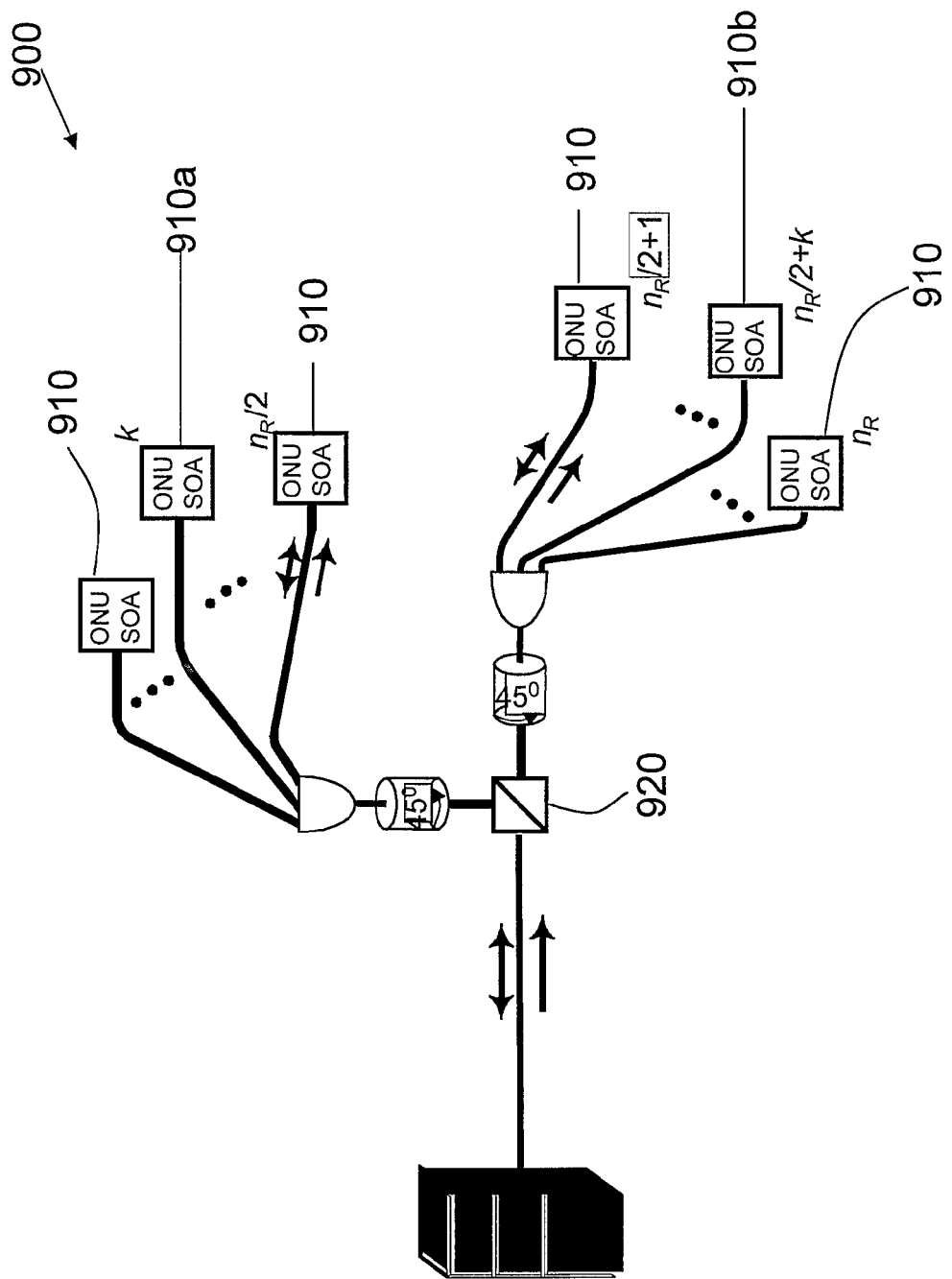

Reference is now made to FIG. 8 illustrating reflective ONU transmitter 800 in accordance to $4^{th}$ system embodiment. The reflective ONU transmitter is a sub-system of the ONU used in the $4^{th}$ system embodiment. The un-modulated carrier signal 810, traverse the modulating SOA 820 and the Faraday Mirror (FM) 730, then reflected as amplitude modulated signal carrying 830 the binary upstream information modulated by the SOA. The SOP of the reflected output signal 840 is perpendicular to that of the input signal. As illustrated by FIG. 9, the input 850 of such arrangements are connected to the PBS 920 (in FIG. 9).

Two 45° FRs at the PBS outputs (x- and y-ports) followed by the conventional splitters from which the lead fibers to the various ONUs emanate.

In each ONU we replace the conventional mirror of the reflective SOA with a 45° FM, i.e. the upstream branch of the ONU structure (further down from the WDM mux/demux combining/splitting the upstream and downstream signals) is the Modulated SOA terminated in the 45° FM.

Reference is now made to FIG. 9 illustrates system 900 with PoITDM PON using a simple PBS 920 at the first splitting level, a reflective transmitter at the ONU 910, 910a, 910b, and the $4^{th}$ OLT embodiment an ONU consisting of an SOP modulation transmitter in accordance to the preferred embodiment.

The principle of operation of the $\lambda_2$ (e.g., 1.3 μm) transmission in the section of the network from the PBS to the ONUs (this is the upstream un-modulated carrier signal, generated at the OLT and distributed downstream to the reflective ONUs) is then as follows: Each $\lambda_2$ signal exiting the PBS in the field splitter, bound downstream, is retroreflected along the path of the 45° FR, the conventional passive splitter, the lead fiber, the SOA and the 45° FM, and then back up through the SOA, the fiber and the conventional passive splitter (acting as a combiner) and back up through the 45° FR, and then back to the x- or y-port. As the retroreflective arrangement returns the same polarization, the x-output is then returned as x-input and the y-output is returned as y-input at the PBS, hence the light back from the ONUs is losslessly combined (barring excess losses).

Figure 10:
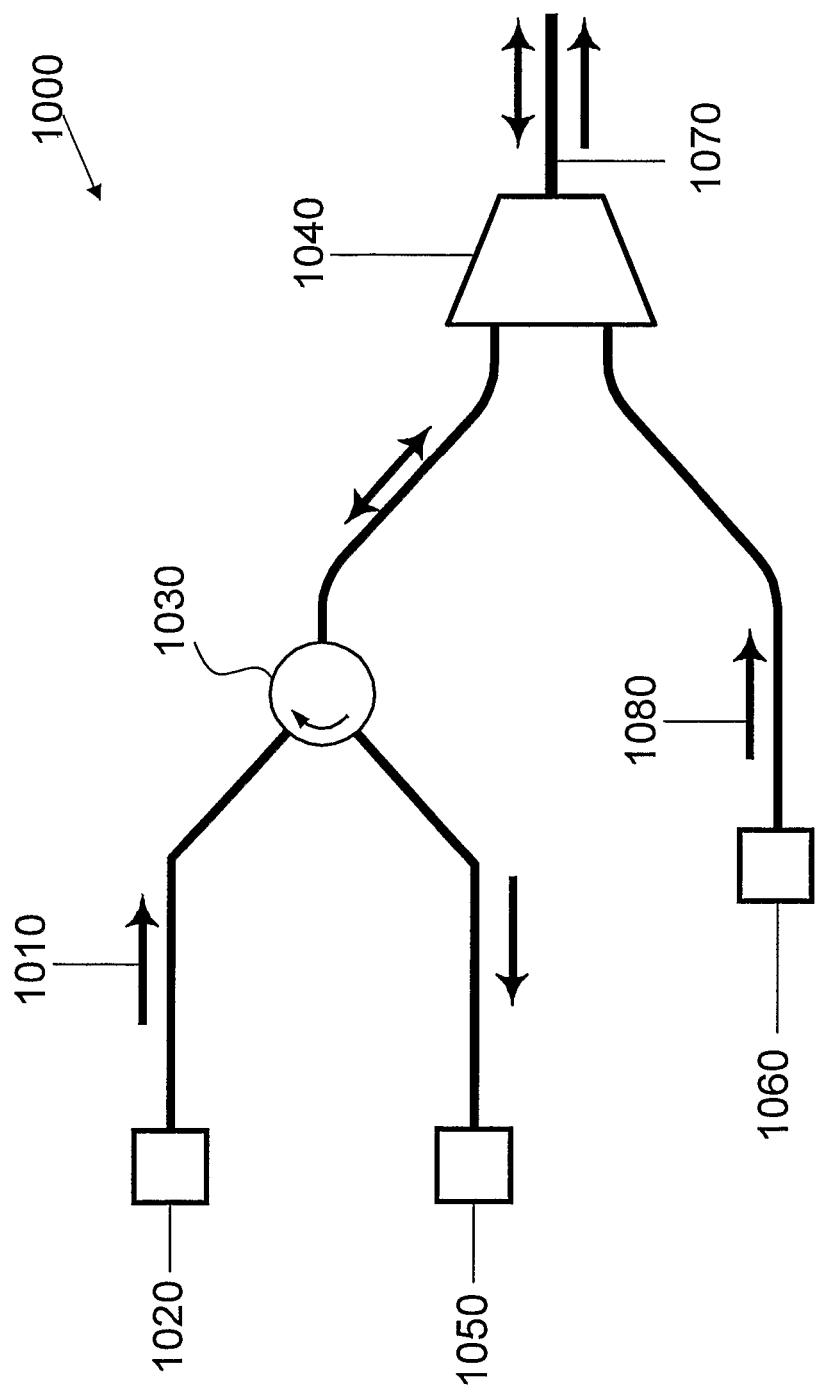

Reference is now made to FIG. 10 illustrates the OLT general block diagram 1000 generating the $\lambda_2$ un-modulated carrier signal 1010 which is multiplexed/demultiplexed in wavelength with downstream signal 1080. The $\lambda_1$ downstream signal is generated in by a SOP modulator 1060, propagating through the WDM 1040 into the trunk fiber 1070 that connects the OLT to the PBS 920 (FIG. 9) in the downstream direction.

An un-modulated $\lambda_2$ carrier 1010, at a fixed designated SOP, is generated by a SOP modulator 1020, passing through a circulator 1030 to the WDM 1040 and into the network in the downstream direction. The modulated $\lambda_2$ signal in the upstream direction, is routed by the WDM to the circulator, and then into the OLT SOP demodulator 1050, decoding the signal simultaneously transmitted by two ONUs.

A circulator is a 3-port device, with ports marked A, B, C, such that the upstream un-modulated carrier signal (propagating in the downstream direction, at this section) entering port A, goes into port B, and the reflected-modulated upstream signal coming from the ONU into port B is diverted to port C,) with its port B connected into the WDM coupler and its port C connected to a Stokes Parameters Detector (SPD).

At the beginning of each coherency interval, a training signal, coordinated with the ONU SOAs, is transmitted by the OLT $\lambda_2$ SOP modulator, utilized to learn the trunk fiber transformation which rotates the x and y-polarizations coming from the PBS. The analysis of this training signal is utilized by the $\lambda_2$ SOP modulator in the OLT to shape the SOP of the un-modulated carrier signal so as to bring equal powers to the two x- and y-ports of the PBS connected to port B, for each pair of users. This effectively provides balanced optical power splitting between the x- and y-users accessed in each time slot, irrespective of their relative losses, yielding the same advantage as attained in the downstream by similar means.

This training information is further used by the $\lambda_2$ SPD at the OLT to process the transformed signal (rotated while propagating upstream in the trunk fiber) and decode the individual signals transmitted by each of the two ONUs transmitting simultaneously.

It now remains to describe the distributed protocol used by the OLT and ONUs in order to make sure that the x- and y-users accessed in each time slot are balanced in power, in the sense that the 1.3 um signals received from each of the two users have equal power.

This protocol is more complex than the downstream one (at 1.5 um), as it is a round trip protocol involving the cascade of the following three matrices: (i) the Jones matrix of the downstream trunk. (ii) The diagonal matrix from the field PBS to the two users and back to the PBS—this is a diagonal matrix with the elements on the diagonal reflecting the amplitude losses on the x- and y-paths, while the relative phase of the two complex factors reflects the randomly changing phases accrued along two distinct optical paths. Notice that this relative phase is less stable than the relative phase between the x- and y-polarizations after traversing a single piece of fiber, as here we have two separate pieces of fiber, whereas in the case of a single piece of fiber there is a common phase affecting both polarizations, hence the relative phase is more stable in that case. This means that the relative phase of this diagonal matrix may be changing over a time scale more rapid than the coherence interval for birefringence, hence the protocol must be designed to be immune to such variations. (iii) The trunk matrix under backward propagation (given by the transpose of the trunk matrix under forward propagation.

Given the more complicated round trip nature of the problem, and the uncertainty in the relative phase of diagonal matrix (ii), we are required to use in the OLT a more complex 1.3 um polarization-sensitive receiver—namely a device capable of measuring Stokes parameters, called Stokes Parameter Detector (SPD). The SPD is essentially known and consists of splitting the input signal into three PBS, with the $2^{nd}$ one oriented at 45 deg with respect to the first one, while the $3^{rd}$ one having ahead of it a ¼ wave plate.

The SPD amounts to detecting not only the amplitudes (squared) of the polarization components but also their phases.

The protocol is based on turning off the SOA in each x-y-pair of users at a time, such that the upstream signal emerging from the field PBS is either x- or y-polarized (relative to the PBS axes). The total 1.3 um power received at the OLT is then up to a factor equal to the x- or y-upstream power at the field PBS. A maximization algorithm varies the OLT downstream SOP under fixed total transmit power, such as to seek the SOP which maximizes the received total 1.3 um power. This amounts to a max search of a function defined over the Poincare sphere, and can be conducted by gradient search or Newton algorithms. From the two maximum-achieving downstream 1.3 um SOPs (called here pseudo-modes) the downstream trunk Jones matrix (i) is readily obtained up to some phase factors. Sending more additional training SOPs we can recover the downstream trunk Jones matrix entirely (up to a common phase factor).

Transposing the downstream trunk matrix yields the upstream trunk Jones matrix (iii). The two losses experienced in the paths from the field PBS to the two x- and y-users and back can also be inferred from this measurement. One can then scale the two pseudomodes such that the upstream powers at either the field PBS or the OLT upstream PBS are equal, in effect compensating for the unequal losses of the x- and y-paths. The fact that the diagonal matrix (ii) is unknown in phases does not affect this measurement.

Notice that once the matrix (ii) drifts in the relative phase during the coherence interval, the relative powers of the x- and y-polarization at the field PBS, generated by sending the superposition of the two pseudomode SOPs do not change, as they are entirely determined by the trunk matrix which is stable during the coherence interval, as well as by the losses from the field PBS to the x- and y-users. However the relative phase between the upstream signals in the x- and y-polarizations at the field PBS does drift, which would cause fading at an OLT receiver using just a single PBS. The usage of the SPR at the OLT receiver, coupled with signal processing either in the Stokes or Jones domain, is intended to be able to undo the retardation effect of the relative phase between the upstream signals in the x- and y-polarizations, in effect undoing the uncontrolled variations in matrix (ii).

6. State of Polarization (SOP) Modulator

A SOP Modulator (SOP-MOD) is an active optical component capable of transmitting and alternating a polarized light beam at any designated SOP and power (within the limits pf a maximum power constraint) at a designated symbol rate. Specifying the SOP requires 3 parameters: x-polarization amplitude, y-polarization amplitude and relative phase of the x and y polarizations, the SOP does not specify the phase term common to both polarization components.

Figure 11:
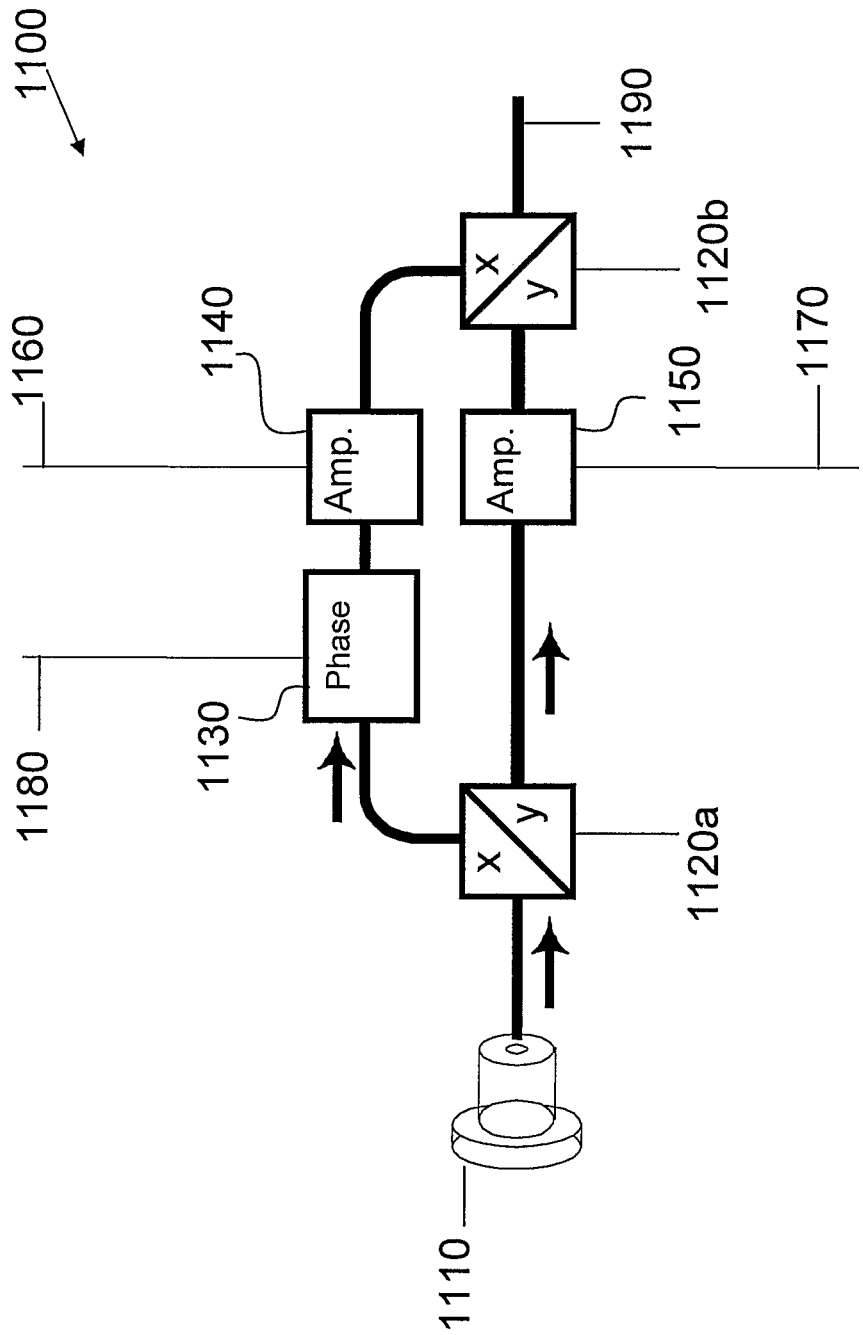

Reference is now made to FIG. 11 illustrates a state of polarization (SOP) modulation transmitter 1100, in accordance to our embodiment, showing a polarized laser transmitting a 45° linear SOP 1110, split by a PBS 1120a into its equal power x and y polarization components. The x-polarization signal traverses through a phase modulator 1130, setting the relative phase between the polarization components, followed by an amplitude modulator 1140 setting the x-polarization amplitude and connecting into the PBS 1120b (acting as a polarization beam combiner). The y-polarization component traverses through an amplitude modulator 1150 and combined with the x-polarization component at the PBS 1120b, shaping, together with the x-amplitude modulator, the SOP direction. The output signal on line 1190 (FIG. 11) is then transmitted to the WDM 1040 in FIG. 10, through the downstream 1080 fiber. The three signals controlling the SOP modulator (x amplitude 1160, y-amplitude 1170 and relative phase 1180 are set by the transmitter controller according to the required SOP, e.g., in the case of the $\lambda_1$ downstream transmitter at the OLT, the linear combination of PMs (2): $E^s = E_0(A_x^{(k)} s_1 + A_y^{(k)} s_2)$ is split into its x and y components, setting the input to the x, y amplitude modulators, while the relative phase between the two elements of $E^s$ is calculated, setting the input to the phase modulator of the x-polarization.

As used herein, an element or step recited in the singular and proceeded with the word "a" or "an" should be understood as not excluding plural elements or steps, unless such exclusion is explicitly recited.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. An optical communication system comprising:
a server having a server transceiver for transmitting optical downlink signal to plurality of end user transceivers capable of detecting optical signals, wherein said server transceiver is capable of transmitting polarization controlled optical downlink signal;
a trunk single mode, non polarizing optical fiber receiving downlink signal from said server transceiver and transferring said signal to server port of a polarizing beam splitter; said polarizing beam splitter directs X polarization and Y polarization components of said downlink signal to X port and Y port of said polarizing beam splitter respectively;
an X non-polarizing single mode optical fiber connected to X port of said polarizing beam splitter and transmitting said X component of said downlink signal to at least one user; and
a Y non-polarizing single mode optical fiber connected to Y port of said polarizing beam splitter and transmitting said Y component of said downlink signal to at least one user, wherein said server transceiver capable of transmitting downlink polarization controlled signal such that said downlink signal is substantially transmitted to one of X port or Y port depending to which of said users said downlink signal is intended;
wherein at least one of said end user transceivers comprises a first laser arranged to emit first laser signals polarized in first polarization and a second laser arranged to emit second laser signals polarized in second polarization, wherein said first and second polarization are substantially orthogonal;
wherein the server transceiver is arranged to receive the first and second laser signals, to determine which of the first and second laser signals are stronger and to transmit feedback data to the at least one of said end user transceivers indicative of which of the first and second laser signals are stronger.

2. The system of claim 1 wherein said transmitter of said server transceiver comprises: a solid state laser for emitting optical signal; a splitting polarizing beam splitter for splitting said optical signal to a first and second polarizations branches; an intensity modulator for modulating intercity of signal in said first polarization branch; an intensity modulator for modulating intercity of signal in said second polarization branch; a phase modulator for modulating relative phase of signals in said first and second polarization branches; and a combiner polarizing beam splitter for combining optical signals from said first and second polarizations branches, wherein modulation parameters of said modulators are selected such that downlink signal is substantially transmitted to one of X port or Y port depending to which of said users said downlink signal is intended.

3. The system of claim 2 wherein said modulation parameters of said downlink modulators are calculated non-iteratively in response to feedback data provided by at least one end user based on training signal transmitted by said server transceiver.

4. The system of claim 2 wherein said modulation parameters of said downlink modulators are calculated iteratively in response to feedback data provided by at least one end user based on training signal transmitted by said server transceiver.

5. The system of claim 1 and further comprising at least one non-polarizing splitter/combiner connected to at least one of said X non-polarizing single mode optical fiber or said Y non-polarizing single mode optical fiber for directing downlink signal to plurality of end users.

6. The system of claim 1 wherein said server controlling of said downlink polarization controlled signal is in response to information received from at least one of said end users.

7. An optical communication system comprising:
a server having a server transceiver for transmitting optical downlink signal to plurality of end user transceivers capable of detecting optical signals, wherein said server transceiver is capable of transmitting polarization controlled optical downlink signal;
a trunk single mode, non polarizing optical fiber receiving downlink signal from said server transceiver and transferrin said signal to server port of a polarizing beam splitter; said polarizing beam splitter directs X polarization and Y polarization components of said downlink signal to X port and Y port of said polarizing beam splitter respectively;
an X non-polarizing single mode optical fiber connected to X port of said polarizing beam splitter and transmitting said X component of said downlink signal to at leas one user;
a Y non-polarizing single mode optical fiber connected to Y port of said polarizing beam splitter and transmitting said Y component of said downlink signal to at leas one user, wherein said server transceiver capable of transmitting downlink polarization controlled signal such that said downlink signal is substantially transmitted to one of X port or Y port depending to which of said users said downlink signal is intended; and
a server wavelength multiplexer having:
a common port connected to said trunk single mode, non polarizing optical fiber receiving downlink signal from said server;
a first wavelength port connected to and in proximity to said server port of said polarizing beam splitter; and
a second wavelength port connected to and in proximity to a common port of an uplink non polarizing beam splitter/combiner;
an X branch wavelength multiplexer having:
a common port connected to said X single mode fiber;
a first wavelength port connected to and in proximity to said X port of said polarizing beam splitter; and
a second wavelength port connected to and in proximity to first port of said non polarizing beam splitter/combiner; and
an Y branch wavelength multiplexer having:
a common port connected to said Y single mode fiber;
a first wavelength port connected to and in proximity to said Y port of said polarizing beam splitter; and
a second wavelength port connected to and in proximity to second port of said non polarizing beam splitter/combiner;
wherein server transceiver transmit optical signals at first wavelength while said end user transceivers transmit signals at second wavelength.

8. The system of claim 7 wherein at least one of said end user transceivers further comprises an optical transmitter that is arranged to transmit optical signal to be detected by said server transceiver.

9. The system of claim 8 wherein at least one said end user optical transmitter capable of transmitting uplink polarization controlled optical signal such that said uplink polarization controlled optical substantially transmitted through said polarizing beam splitter.

10. The system of claim 9 wherein at least one said end user optical transmitter capable of transmitting uplink polarization controlled optical signal comprises: a first laser for emitting signal polarized in first polarization; a second laser for emitting signal polarized in second, polarization, wherein said first and second polarization are substantially orthogonal; and a combining polarizing beam splitter for directing light from said first and second lasers to one of said X non-polarizing single mode optical fiber or Y non-polarizing single mode optical fiber, wherein selection of first, second or both lasers to be operated to transmit uplink signal is chosen depending on transmission of said uplink signal through said polarizing beam splitter.

11. The system of claim 9 wherein at least one said end user optical transmitter is arranged to transmitting uplink polarization controlled optical signal comprises: a solid state laser for emitting optical signal; a splitting polarizing beam splitter for splitting said optical signal to a first and second polarizations branches; an intensity modulator for modulating intercity of signal in said first polarization branch; an intensity modulator for modulating intercity of signal in said second polarization branch; a phase modulator for modulating relative phase of signals in said first and second polarization branches; and a combiner polarizing beam splitter for combining optical signals from said first and second polarizations branches, wherein modulation parameters of said modulators are selected on transmission of said uplink signal through said polarizing beam splitter.

12. The system of claim 9 wherein said polarization state of at least one of said uplink user transceiver is calculated non-iteratively in response to feedback data provided by said server based on training signal transmitted by said end user transceiver.

13. The system of claim 9 wherein said polarization state of at least one of said uplink user transceiver is calculated iteratively in response to feedback data provided by said server based on training signal transmitted by said end user transceiver.

14. The system of claim 8 wherein server transceiver is capable to detect and analyze polarization sensitive uplink optical signal.

15. An optical communication system comprising:
a server having a server transceiver for transmitting optical downlink signal to plurality of end user transceivers capable of detecting optical signals, wherein said server transceiver is capable of transmitting polarization controlled optical downlink signal;
a trunk single mode, non receiving downlink signal from said server transceiver and transferring said signal to server port of a polarizing beam splitter; said polarizing beam splitter directs X polarization and Y polarization components of said downlink signal to X port and Y port of said polarizing beam splitter respectively;
an X non-polarizing single mode optical fiber connected to X port of said polarizing beam splitter and transmitting said X component of said downlink signal to at least one user;
a Y non-polarizing single mode optical fiber connected to Y port of said polarizing beam splitter and transmitting said Y component of said downlink signal to at least one user, wherein said server transceiver capable of transmitting downlink polarization controlled signal such that said downlink signal is substantially transmitted to one of X port or Y port depending to which of said users said downlink signal is intended; and
a server transceiver comprising:
a server downlink transmitter emitting optical signals at first wavelength connected to first wavelength port of a wavelength multiplexer having:

a common port connected to said trunk single mode fiber;

a first wavelength port connected to server downlink transmitter; and a second wavelength port connected to a common port of a beam splitter/combiner;

a carrier transmitter connected to the first port of said beam splitter/combiner and transmitting optical signal at second wavelength to said trunk fiber;

an uplink receiver connected to the second port of said beam splitter/combiner and receiving optical signal at second wavelength from said trunk fiber;

an X 45 degrees Faraday rotator inserted between X port of polarizing beam splitter and X fiber in proximity to X port of said polarizing beam splitter;

a Y 45 degrees Faraday rotator inserted between Y port of polarizing beam splitter and Y fiber in proximity to Y port of said polarizing beam splitter; and wherein at least one user transceiver further comprising a controlled optical amplifier capable of controllably amplifying optical signals at second wavelength in response to uplink data, said amplifier is connected to one of X or Y fibers at its first port and to a 45 degrees Faraday mirror at its second port.

16. The system of claim 15 wherein said server is arranged to control said downlink polarization controlled signal in response to information received from at least one of said end users transceivers.

17. The system of claim 16 wherein at least one of the end user transceivers is arranged to transmit uplink polarization controlled optical signal such that said uplink polarization controlled optical substantially transmitted through a polarizing beam splitter of the end user transceiver.

18. The system of claim 15 wherein at least one said end user optical transceiver comprises: a first laser for emitting signal polarized in first polarization; a second laser for emitting signal polarized in second, polarization, wherein said first and second polarization are substantially orthogonal; and a combining polarizing beam splitter for directing light from said first and second lasers to one of said X non-polarizing single mode optical fiber or Y non-polarizing single mode optical fiber, wherein selection of first, second or both lasers to be operated to transmit uplink signal is chosen depending on transmission of said uplink signal through said polarizing beam splitter.

19. The system of claim 17 wherein at least one said end user optical transceiver comprises: a solid state laser for emitting optical signal; a splitting polarizing beam splitter for splitting said optical signal to a first and second polarizations branches; an intensity modulator for modulating intercity of signal in said first polarization branch; an intensity modulator for modulating intercity of signal in said second polarization branch; a phase modulator for modulating relative phase of signals in said first and second polarization branches; and a combiner polarizing beam splitter for combining optical signals from said first and second polarizations branches, wherein modulation parameters of said modulators are selected on transmission of said uplink signal through said polarizing beam splitter.

20. The system of claim 19 wherein said polarization state of at least one of said uplink user transceiver is calculated non-iteratively in response to feedback data provided by said server based on training signal transmitted by said end user transceiver.

* * * * *